(12) United States Patent
Beswick et al.

(10) Patent No.: US 6,786,465 B1
(45) Date of Patent: Sep. 7, 2004

(54) METERING AND FLOW CONTROL VALVE

(75) Inventors: Paul R. Beswick, Newington, NH (US); Gary A. Treadwell, Dover, NH (US)

(73) Assignee: Beswick Engineering, Inc., Greenland, NH (US)

(*) Notice: Subject to any disclaimer, the term of this patent is extended or adjusted under 35 U.S.C. 154(b) by 120 days.

(21) Appl. No.: 09/952,841

(22) Filed: Sep. 13, 2001

Related U.S. Application Data

(60) Provisional application No. 60/232,661, filed on Sep. 14, 2000.

(51) Int. Cl.[7] .............................................. F16K 31/02
(52) U.S. Cl. .................... 251/129.11; 251/309; 251/311
(58) Field of Search ........................... 251/129.11, 248, 251/309, 310, 311, 305, 304; 137/454.6

(56) References Cited

U.S. PATENT DOCUMENTS

| | | | |
|---|---|---|---|
| 4,037,623 A | | 7/1977 | Beswick |
| 4,058,289 A | * | 11/1977 | Hicks ........................ 251/304 |
| 6,412,516 B1 | * | 7/2002 | Goldsmith ............... 137/454.6 |

* cited by examiner

*Primary Examiner*—Edward K. Look
*Assistant Examiner*—John K. Fristoe, Jr.
(74) *Attorney, Agent, or Firm*—Lorusso Loud & Kelly LLP

(57) ABSTRACT

A valve for controlling the rate of fluid flow therethrough by rotating a rotor about a spindle having an inlet bore in communication with an eccentrically oriented o-ring set into an eccentrically oriented slot formed in the rotor. The perimeter of the eccentric slot is modified to provide customized unique fluid flow response curves.

5 Claims, 21 Drawing Sheets

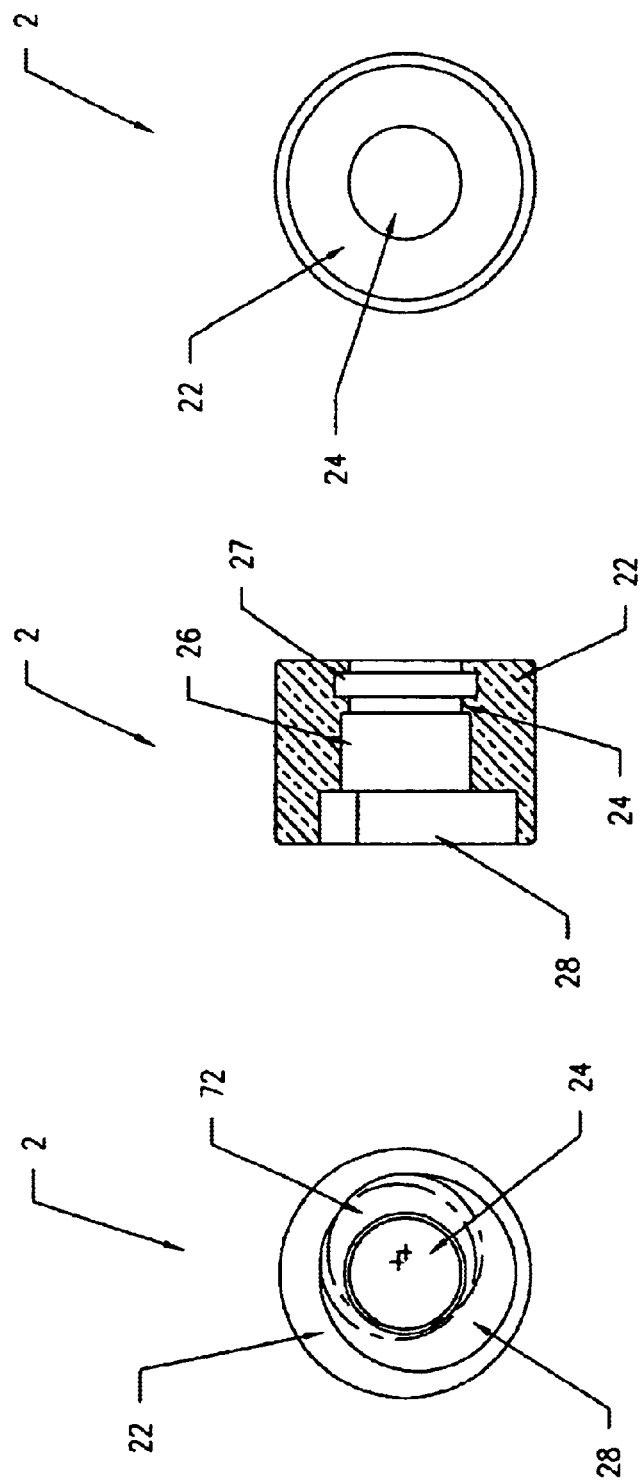

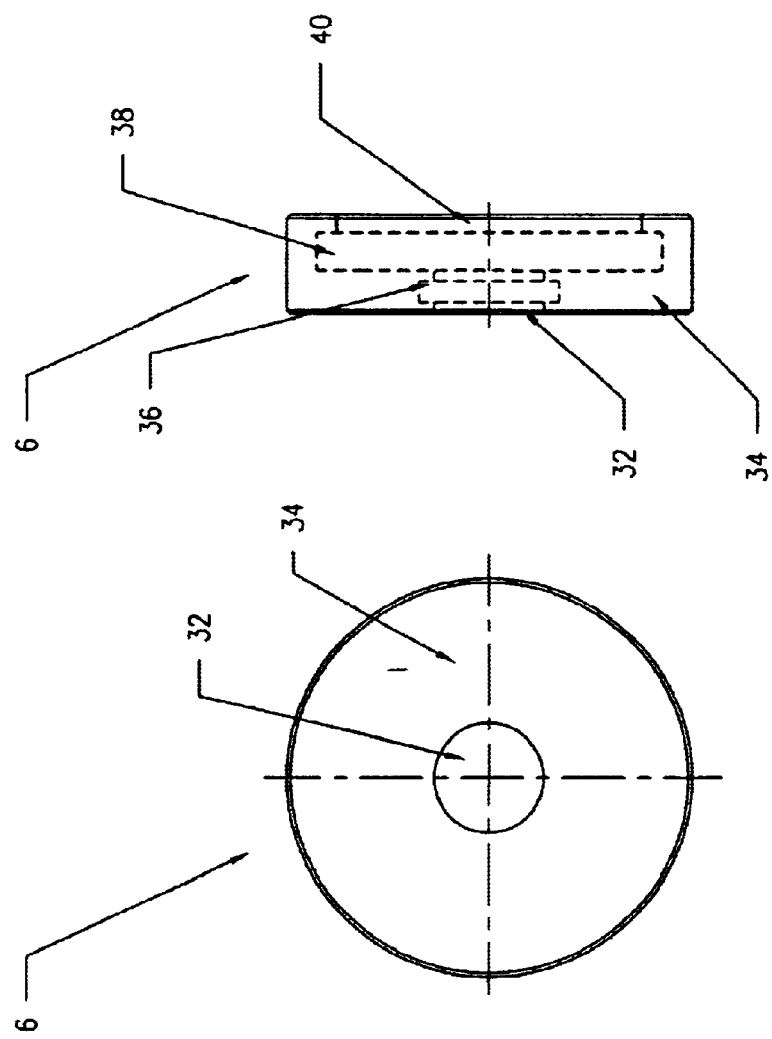

FLOW VS. SLEEVE POSITION

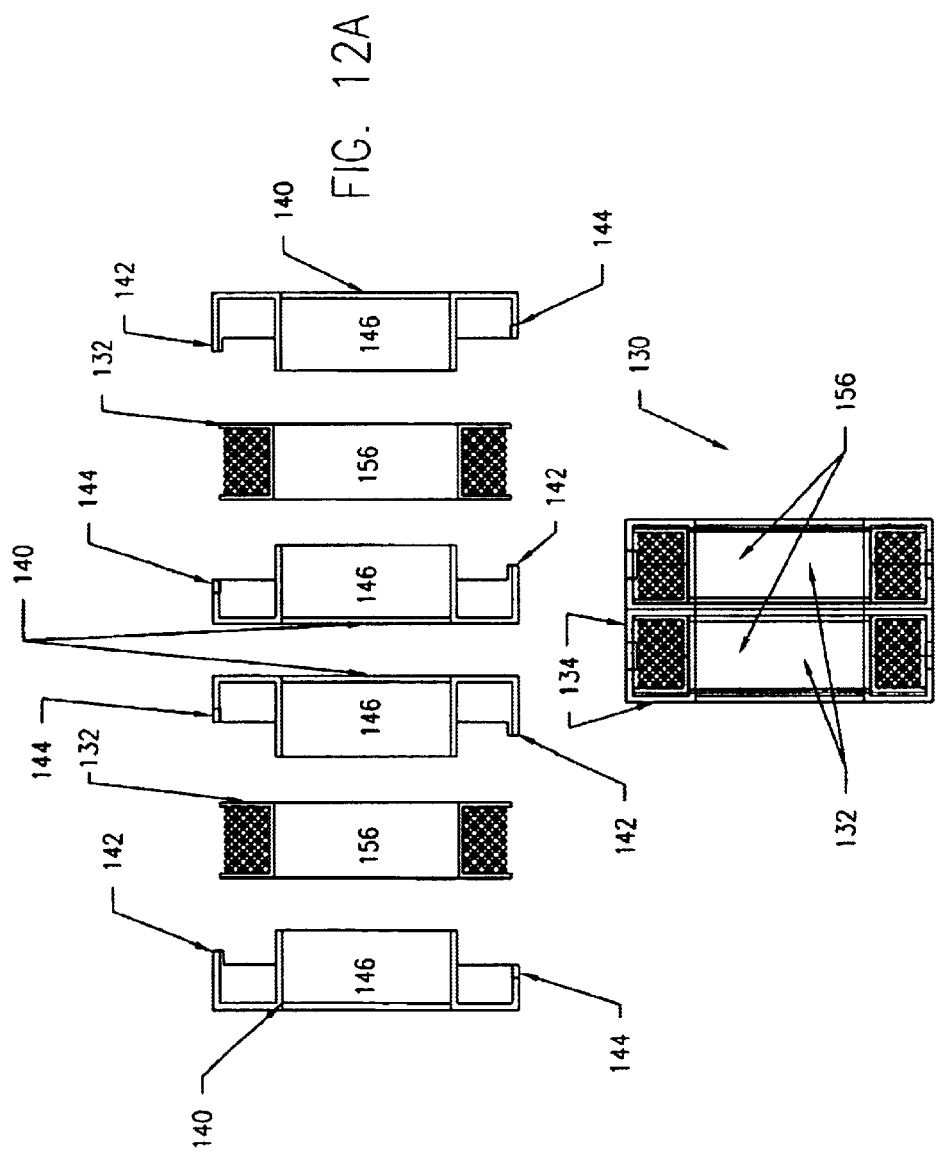

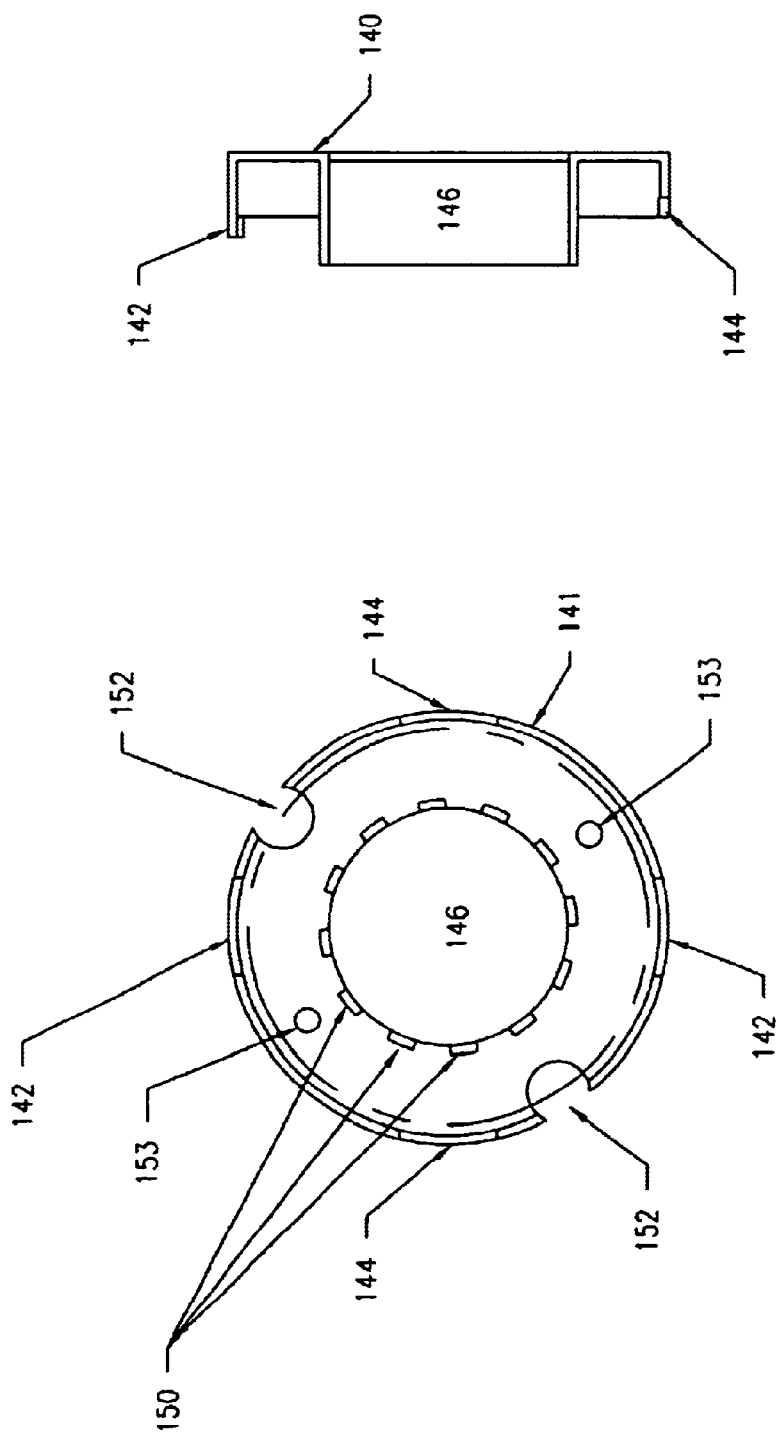

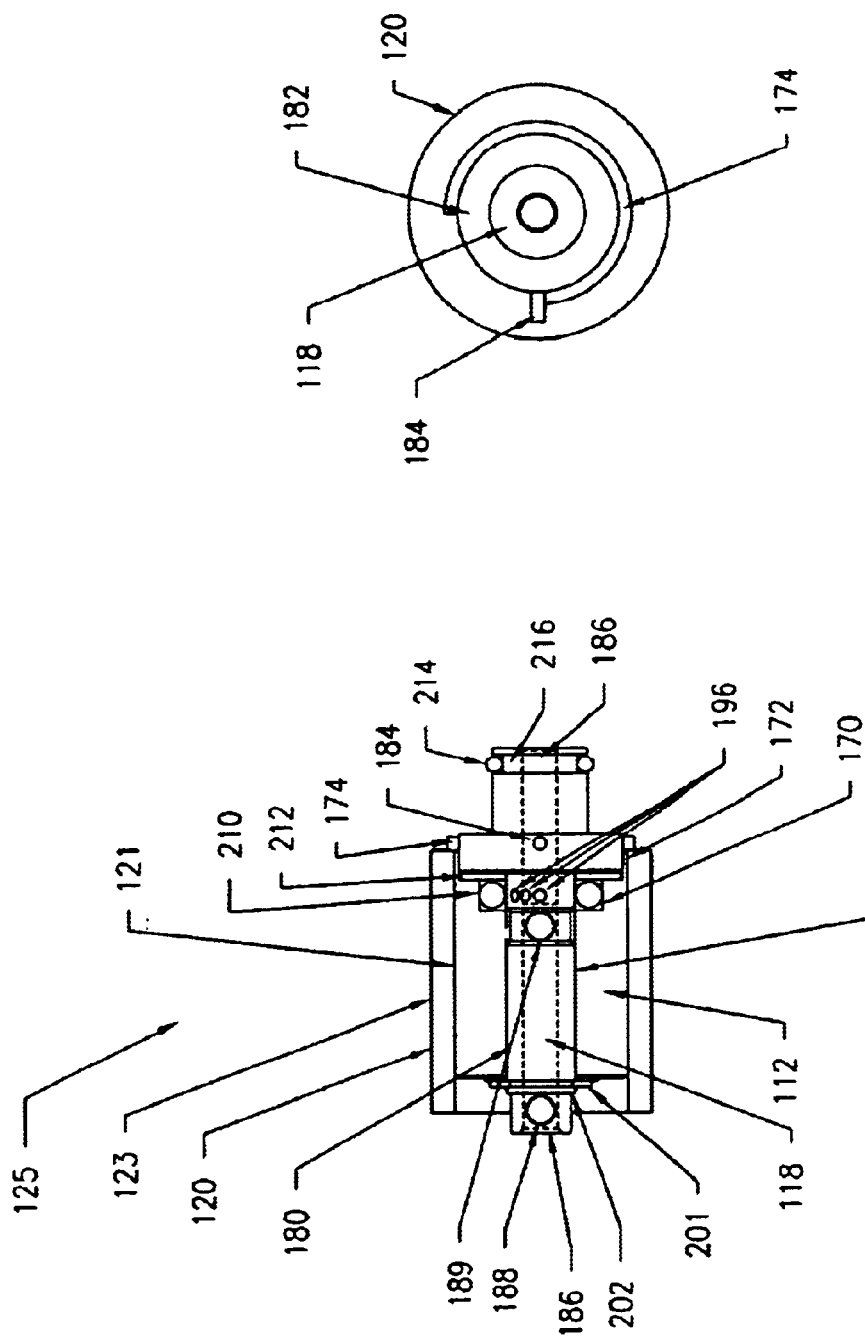

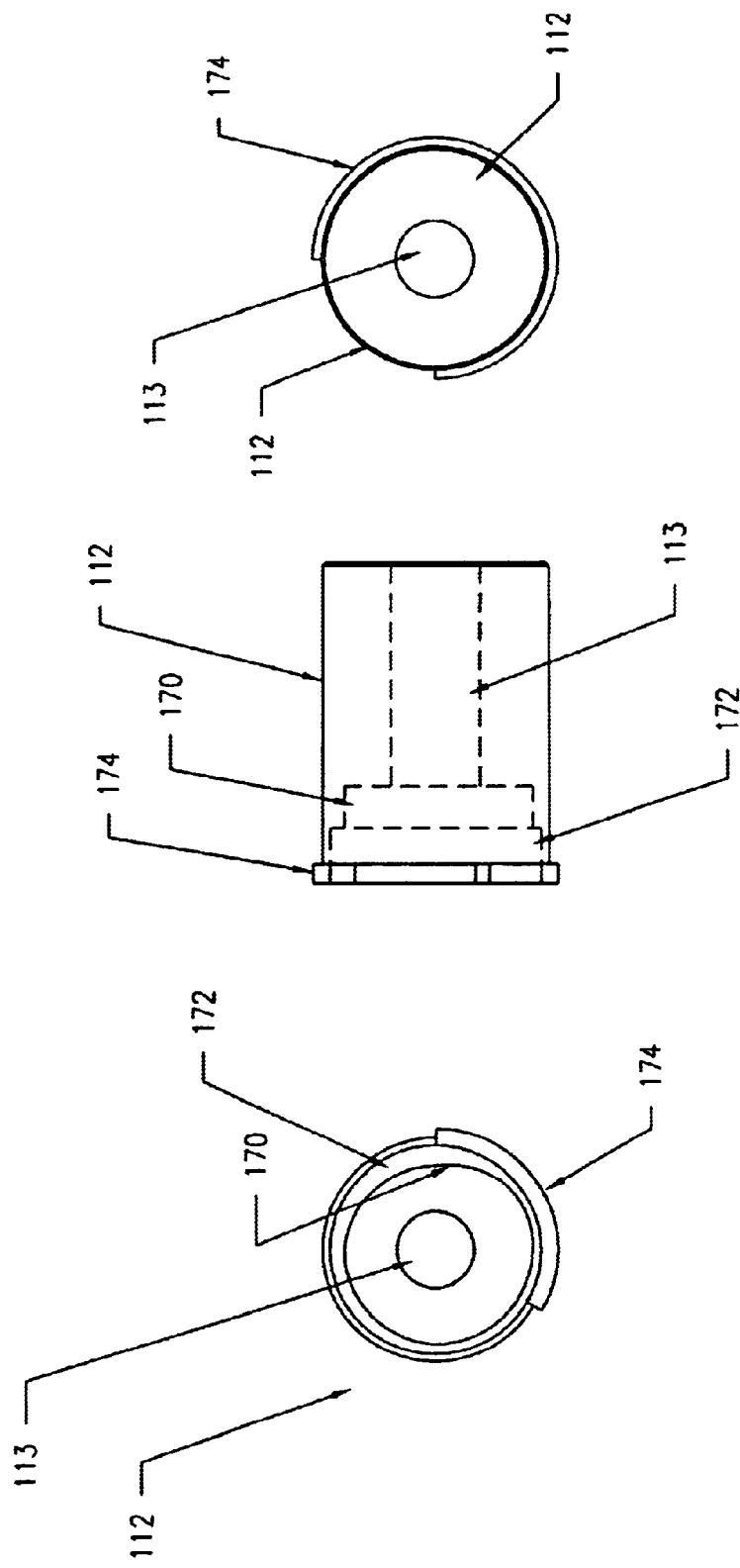

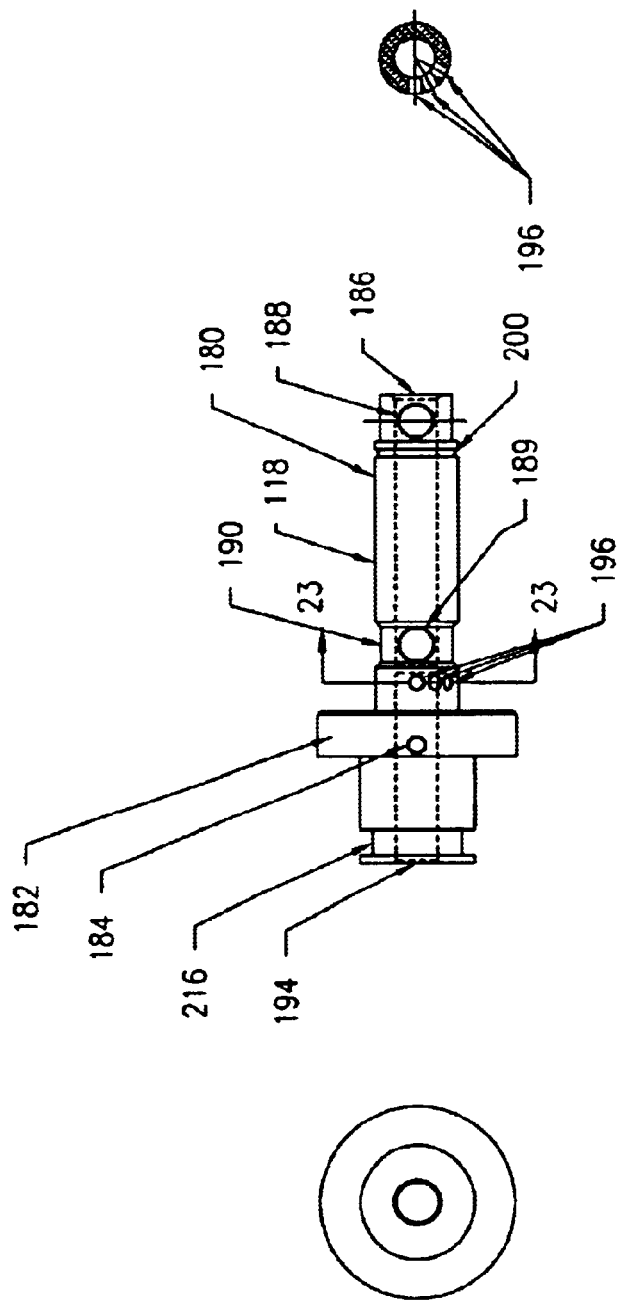

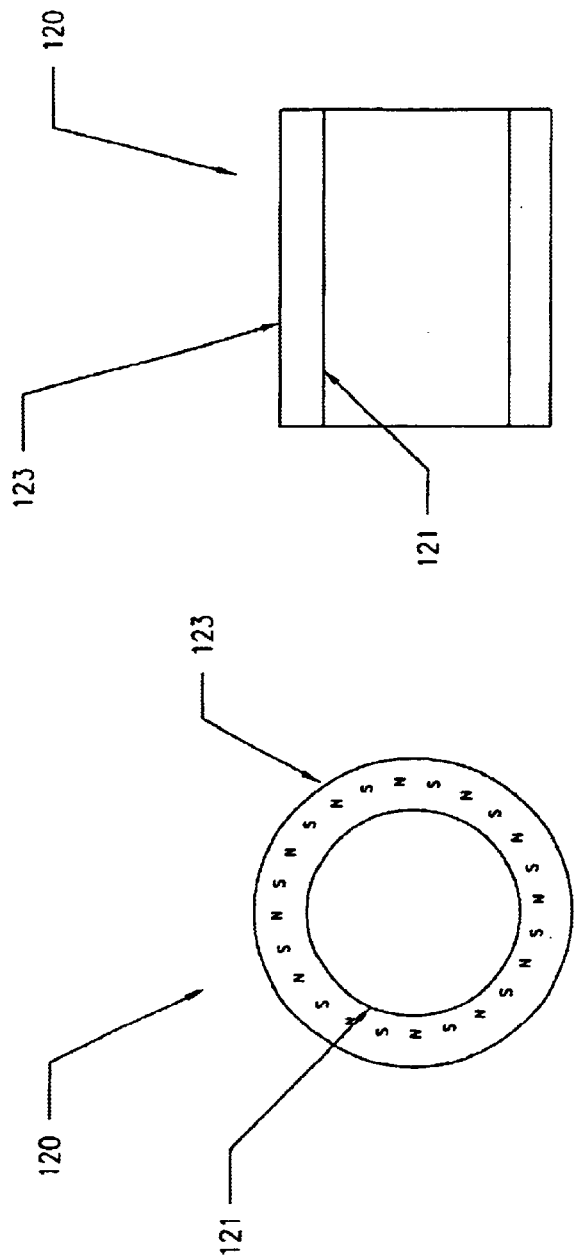

FIG. 29 FIG. 30 FIG. 31 FIG. 32

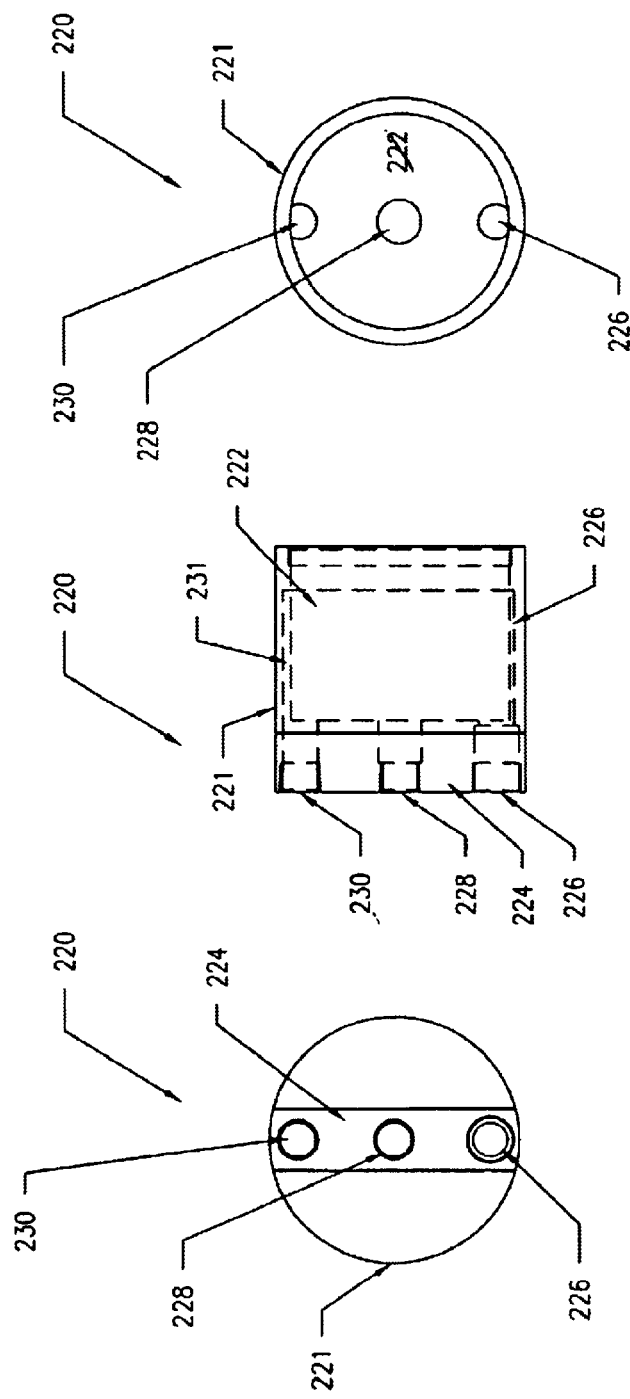

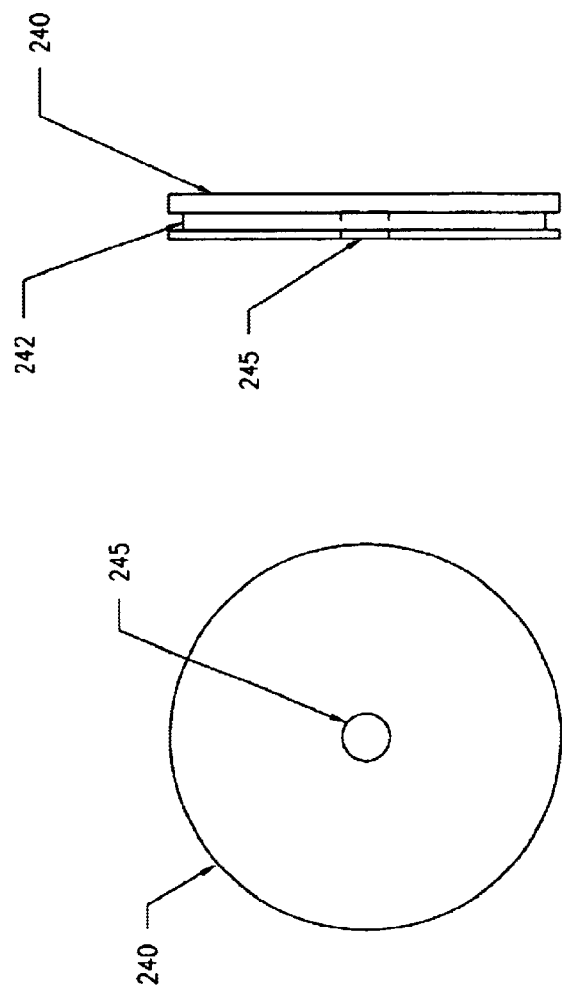

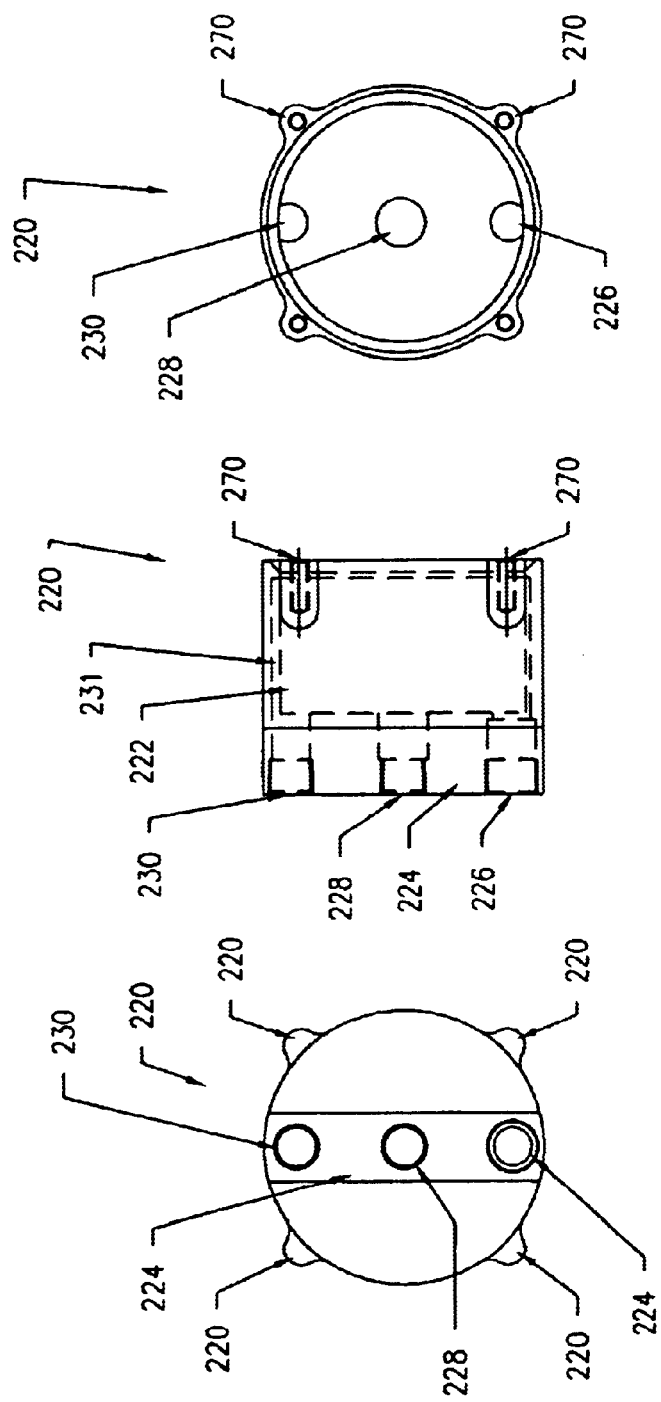

METERING AND FLOW CONTROL VALVE

This application claims the benefit of Provisional Application No. 60/232,661, filed Sep. 14, 2000.

FIELD OF THE INVENTION

This invention relates generally to valves for controlling fluid flow. More particularly, the invention relates to valves for metering fluid flow manually and with electronic means.

BACKGROUND OF THE INVENTION

Almost all valves consist of a fixed body containing a hole or port covered by a sealing element. This sealing element (valve) can uncover the port to varying degrees and allow fluid to flow. The arrangement of these elements generally takes the form of axial pairs (lift valve), turning pairs (rotary valve motion), screw pairs (helical valve motion), and sliding pairs (gate valve). These valve elements are accepted practice, have been utilized for centuries and there are many manufacturers using these principles to accomplish the same task.

The miniature valve market, typified by manufacturers like Clippard, Pneumadyne and Whitey, offer a variety of metering valves. However, all are needle valve designs. Needle valves are capable of precise metering but have several drawbacks. A needle valve is an axially arranged device and its accommodation to applications usually require shapes, ports and manufacturing complexity. In order to adjust flow rates a tapered needle is screwed in and out of a circular aperture enabled by threads coaxially constructed along the needle shaft. The resulting space offered as a flow passage is at best an annulus (and often deteriorates to a crescent) where the area varies with axial needle position created by screw threads. Area is an arithmetic function of the radii squared and accordingly the range of linear sensitive control is only approximate and at the same time narrow. Also, unless the same material is used throughout, the valve differential expansion leads to an inherent lack of temperature compensation. Furthermore, the tiny clearances generated clog easily and good filtration of the medium is required. Unless exceptionally complex shapes, and/or threads and/or controls are used in the design of the valve, the flow through needle valves is not a linear function of needle position. The needles themselves require precision manufacturing techniques. Since the needle requires several rotations from off to fully open they do not lend themselves to rapid automatic operation. It is also very difficult to arrange a needle valve for "fail safe" operation, i.e., should the valve actuator loose power, the valve cannot be spring or gravity returned to the off position. Moreover, the needle and seat surfaces are subject to damage due to brinelling scuffing and scoring.

Accordingly, there is a need for a valve that solves the problems associated with needle, ball and butterfly, valves. It is among the objects of the invention to provide a valve that simplifies manufacturing requirements. Another object of the invention is to provide a valve the provides a linear response curve. A further object is to provide a valve that allows for customized flow resistance versus valve position. These and other objects will become apparent from a reading of the following summary and detailed description of the illustrative embodiment.

SUMMARY OF THE INVENTION

The invention described herein overcomes several of the drawbacks found with competing devices and offers added versatility and ease of manufacture. The valve is an extreme case of rolling hypocycloidal motion which is the geometric name given to a circle rolling inside a larger circle. In this configuration, the inner circle is 5 to 20% smaller in diameter than the outer circle that includes or contains the control "O" ring. Thus, the seal device not only exhibits this hypocycloidal action but also has a small amount of sliding.

The larger diameter or circle utilizes the inner diameter of an "O"-ring as the throttling or control surface, captured in either a plain circular groove or a uniquely shaped groove as the controlling valve element. This "O"-ring/groove combination is eccentric to the center spindle that contains the valve port and also serves as a channel for directing the fluid to be metered. When off, due to the local squeeze or flattening of the "O"-ring the sealing is accomplished by covering or blocking the valve port and produces a bubble-tight seal. A the sleeve containing the "O"-ring/groove is rotated about the spindle, the eccentricity of the groove allows the "O"-ring to gradually uncover the valve port thereby permitting flow of the upstream pressurized fluid. The extreme positions start from 0 degrees where the port(s) are fully covered to about 180 degrees where the maximum amount of clearance above the port(s) exists. As rotation continues beyond 180 degrees the flow begins to be restricted until at the full 360 degrees the port(s) are completely covered. In other words, the full range of flow modulation takes place over 180 degrees of the outer sleeve rotation and the control is the same for either direction of rotation. In practice, the most useful range of rotation is usually about 90 degrees from fully "off" to maximum useful flow. The geometric nature of the eccentric groove and the proportions of the "O"-ring cross sections with respect to the port sizes create a flow pattern that is approximately sinusoidal but approaching linear with respect to the angle of rotation.

In practice, due to tolerances, deformation of the "O"-ring seal effective control range is about 90 degrees (¼ turn) of rotation, where the valve goes from shut to fully open. This arrangement has numerous advantages over needle valve designs. Further, by machining unique shapes for the gland containing the "O"-ring (easily achieved with modern CNC (computer numeric control) machine tools), the resistance curve of the valve can be tailored to the application. In addition, the sealing surfaces tend to be inherently self-flushing or cleaning, tolerant of debris and insensitive to vibration. In choosing the port of the appropriate size, the maximum resistance of the valve can set to the desired valve. Unlike other ¼ turn valve types (butterfly valves and ball valves), the invention has precision incremental metering characteristics. The internal geometry of ball valves and butterfly valves causes them to open and close very abruptly and thus makes them ill suited to accurately meter flow rates (although they are often used in such applications).

The invention has an inherently gradual open/close cycle. Since it can be shut off within ¼ turn in one embodiment, the valve can be made "fail-safe" by the addition of a spring return. All of these features can be achieved by modification of two machined parts.

BRIEF DESCRIPTION OF THE DRAWINGS

FIG. 4 is a side sectional view of a rotor taken along line A—A in FIG. 5 according to one embodiment of the invention.

FIG. 5 is a top view of a rotor according to one embodiment of the invention.

FIG. 6 is a bottom view of rotor according to one embodiment of the invention.

FIG. 7 is a side elevational view of a cap according to one embodiment of the invention.

FIG. 8 is a top view of a cap according to one embodiment of the invention.

FIG. 12A is an exploded view of a coil/stator plate assembly according to one embodiment of the invention.

FIG. 12B is a side view of a coil/stator plate assembly according to one embodiment of the invention.

FIG. 13 is a top plan view of a twelve pole stator plate according to one embodiment of the invention.

FIG. 14 is a side elevational view of a stator plate according to one embodiment of the invention.

FIG. 17 is a side sectional view of a rotor/spindle assembly according to one embodiment of the invention.

FIG. 18 is a top view of a rotor/spindle assembly according to one embodiment of the invention.

FIG. 19 is a side plan view of a valve rotor according to one embodiment of the invention.

FIG. 20 is a top view of a valve rotor according to one embodiment of the invention.

FIG. 21 is a bottom view of a valve rotor according to one embodiment of the invention.

FIG. 22 is a side sectional view of a spindle according to one embodiment of the invention.

FIG. 23 is a sectional view of a spindle exit port according to one embodiment of the invention.

FIG. 24 is an end view of a spindle according to one embodiment of the invention.

FIG. 25 is a side sectional view of a twelve pole rotor magnet according to one embodiment of the invention.

FIG. 26 is a top view of a twelve-pole rotor magnet according to one embodiment of the invention.

FIG. 29 is a top view of a wire pass through seal according to one embodiment of the invention.

FIG. 30 is a side view of a wire pass through seal according to one embodiment of the invention.

FIG. 31 is a top view of a seal support plate according to one embodiment of the invention.

FIG. 32 is a side view of a seal support plate according to one embodiment of the invention.

FIG. 33 is a side sectional view of a metering valve housing according to one embodiment of the invention.

FIG. 34 is a top view of a metering valve housing according to one embodiment of the invention.

FIG. 35 is a bottom view of a metering valve housing according to one embodiment of the invention.

FIG. 36 is a top view of a metering valve housing seal cap according to one embodiment of the invention.

FIG. 37 is a side view of a metering valve seal cap according to one embodiment of the invention.

FIG. 40 is a side sectional view of a die-cast metering valve housing according to one embodiment of the invention.

FIG. 41 is a bottom view of a die-cast metering valve cap according to one embodiment of the invention.

FIG. 42 is a top view of a die-cast metering valve cap according to one embodiment of the invention.

DETAILED DESCRIPTION OF THE ILLUSTRATIVE EMBODIMENT

Figure 1:
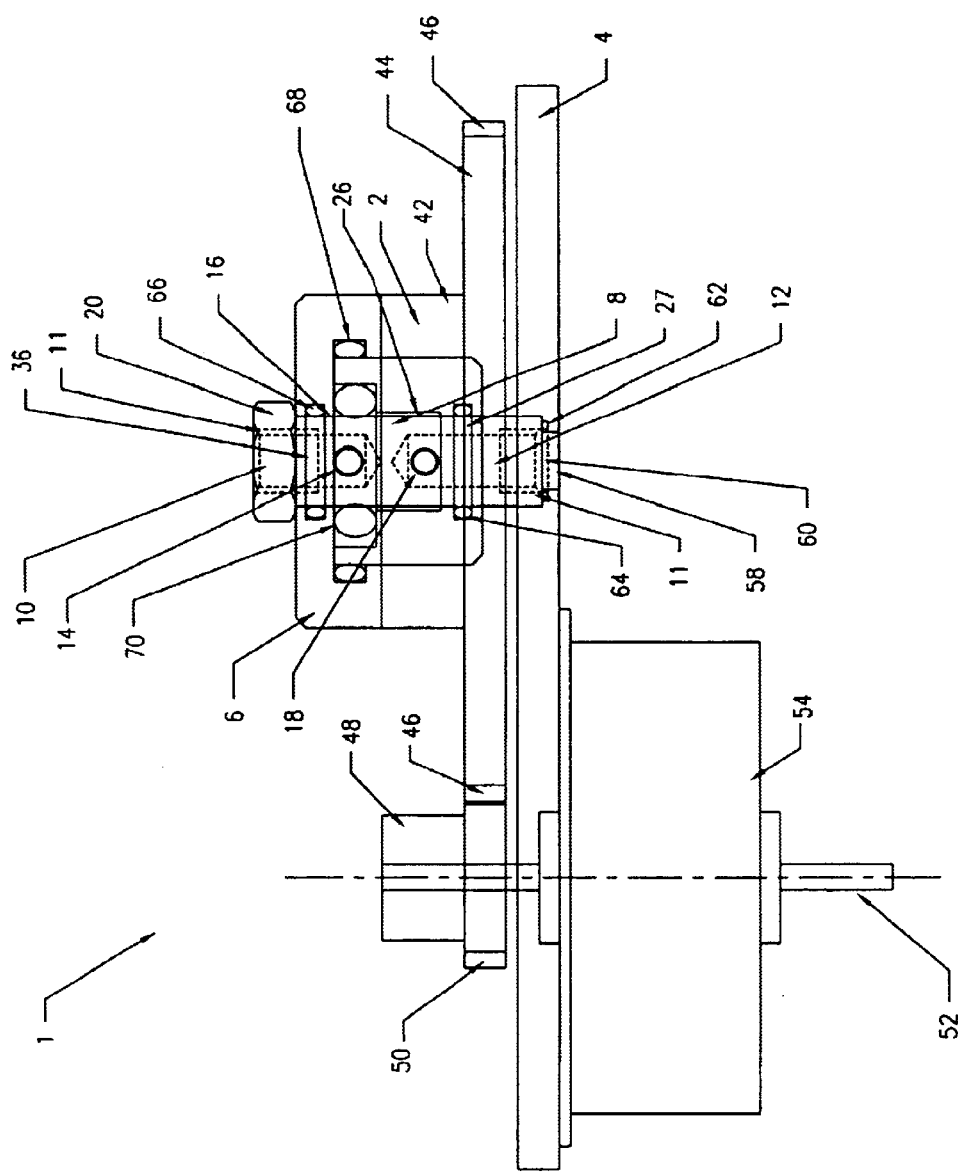
FIG. 1 is a side elevational view of a sleeve valve assembly according to one embodiment of the invention.

As shown in FIG. 1, in its broadest overall aspect, the metering valve (shown generally as 1) is essentially a sleeve valve comprising a rotor 2 secured to a rotor gear 4 at one end and a cap 6 at the opposite end. A spindle 8 is fitted into and freely slides within apertures formed in rotor 2 and cap 6.

Figure 3:
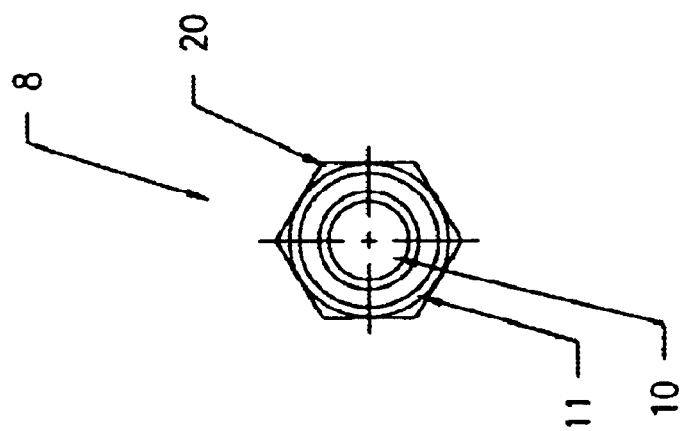
FIG. 3 is a top view of a spindle according to one embodiment of the invention.
Figure 2:
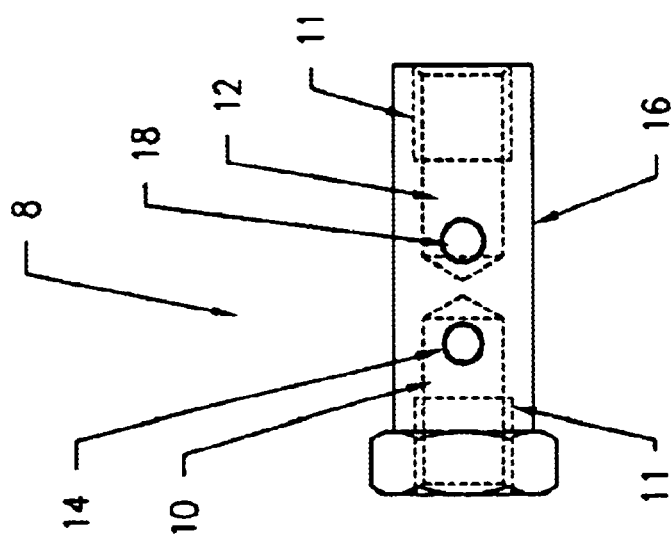
FIG. 2 is a plan view of a spindle according to one embodiment of the invention.

Referring to FIGS. 1–3, spindle 8 has a longitudinal inlet bore 10 and a longitudinal outlet bore 12 situated at opposite ends of spindle 8. The inner walls of bores 10 and 12 are provided with threading 11 (preferably 10–32) for receiving fluid conduit nipples or barbs (not shown). Inlet bore 10 has a radial inlet aperture 14 that extends radially outwardly from inlet bore 10 to an outer wall 16 of spindle 8. Outlet bore 12 has a radial outlet aperture 18 that extends radially outwardly from outlet bore 12 to outer wall 16. Alternatively, spindle 8 can be provided with multiple radial inlet and/or outlet apertures that can be positioned at various points along the length of inlet and outlet bores 10 and 12. For ease of handling, a hexagonal top 20 is provided on spindle 8 to allow spindle 8 to be torqued into a mounting plate described in detail below.

Referring to FIGS. 1 and 4–6, rotor 2 has a substantially cylindrical rotor body 22 within which is formed a spindle bore 24 dimensioned to fit snugly around outer wall 16 of spindle 8 and symmetrically about the longitudinal axis of rotor body 22. A fluid cavity bore 26 is provided in a longitudinally central region of rotor 2, concentrically with spindle bore 24, to provide fluid communication between inlet aperture 14 and outlet aperture 18. Formed proximal to a bottom end of rotor 2 is rotor/spindle o-ring bore 27. Formed in the top end of rotor 2 is eccentric bore 28. Eccentric bore 28 is situated in rotor 2 so that it is coplanar with inlet aperture 14 when assembled. The radial depth of eccentric bore 28 is set so that the o-ring placed in bore 28, as described below, is sufficiently compressed to provide a leak-tight seal of inlet aperture 28. A rotor o-ring bore 30 is formed proximal to the bottom end of rotor body 22.

Referring to FIGS. 1, 7 and 8, rotor cap 6 has a substantially cylindrical cap body 34 and a cap spindle bore 32 dimensioned to snuggly fit against spindle outer wall 16. Formed proximal to a top end of cap 6 and concentrically with bore 32 is cap o-ring bore 36. Formed proximally to a bottom end of cap 6 and in concentric relation with spindle bore 32 is rotor o-ring bore 38. Formed on the bottom end of cap 6 and in concentric relation to spindle bore 32 is rotor-receiving bore 40. Bore 40 is dimensioned to fit snuggly against an outer wall of rotor 2.

Referring to FIG. 1, rotor 2 is press fit into a hub 42 of rotor gear 44. Rotor gear 44 is formed with gear teeth 46 for engaging gear teeth 50 of drive gear 48. Rotor gear 44 and drive gear 48 are preferably made of Delrin®. Drive gear 48 is attached to shaft 52 of motor 54. Motor 54 is preferably a unipolar stepping motor.

To orient motor 54 and drive gear 48 to rotor gear 44, mounting plate 4 is provided. A motor bore (not shown) is formed in mounting plate 4 to allow passage of shaft 52 through plate 4. Motor 54 is secured to the bottom of plate 4 with mechanical fasteners such as screws (not shown). Rotor gear, 44 is secured to the top of plate 4 with mechanical fasteners (not shown). A plate spindle bore 58 is formed concentric with the mounting location of rotor gear 44 to allow for passage of the bottom end of spindle 8. A plate o-ring slot 60 is formed in plate 4, concentric with plate spindle bore 58.

To assemble valve 1, appropriately sized O-rings (preferably formed from buna-n) are fitted into the various o-ring slots to provide leak-tight junctures between the various valve components. Preferably, the O-rings are toroidally shaped but may be square, rectangular or any other regular or irregular geometric cross-sectional shape. O-ring 62 secured into o-ring slot 60 to provide a seal between plate 4 and spindle 8. O-ring 64 is placed into rotor/spindle o-ring bore 27. O-ring 66 is placed into cap o-ring bore 36 to seal between spindle 8 and cap 6. O-ring 68 is placed into rotor o-ring bore 38 to seal between the interface of cap 6 and rotor 2. O-ring 70 is placed in eccentric bore 28 and provides a seal to inlet aperture 14 that is located on the same horizontal plane as bore 28.

The eccentric orientation of bore 28 to spindle 8 causes the seal provided by o-ring 70 to be released or engaged in a substantially linear fashion depending upon the rotational orientation of rotor 2 to spindle 8. In a preferred embodiment, spindle 8 is dimensioned so that it is engaged to and stationary with respect to plate 4 via o-ring 62. The offset of bore 28 can be adjusted to allow for the angular range of motion needed to fully open and fully close inlet aperture 14 to be from about 900 to about 1800. The range of motion to accomplish full closure or full open conditions can be effectuated in either clock-wise or counter-clockwise rotation of rotor 2 about spindle 8.

Fluid flows through inlet bore 10 and out inlet aperture 14 into the cavity formed between the outer wall 16 of spindle 8 and fluid cavity bore 26. The fluid then enters into outlet aperture 18 and into outlet bore 12. All of the O-rings contribute to the integrity of the fluid flow path. To impede fluid flow, one merely needs to rotate rotor/cap/rotor gear assembly about spindle 8 to alter the relationship and contact between o-ring 70 and inlet aperture 14.

In operation, the relationship of o-ring 70 to inlet aperture 14 is similar to the communication between a bicycle tire and a substrate. An inkblot made by the bicycle tire on a flat (or convex) surface is shaped like an elongated diamond terminating as a sharp point on either end. As the tire rolls along a flat or convex surface, the diamond shape moves along the surface in the direction the tire is rolling. By placing, for example, an aperture or hole somewhat smaller in diameter that the cross-sectional diameter of the tire in mid plane, the tire will cover the hole completely when directly above the hole. As the tire continues past the hole, it gradually uncovers the hole. Initially, a partial area of the aperture becomes exposed because the hole is only partly masked and is bisected by the point of the diamond pattern. Continued rolling will eventually uncover the hole completely. The change in area of the exposed hole approaches a linear pattern unlike the effect of the needle valves described above where the exposed area of the round hole is a quadratic function.

Figure 9:
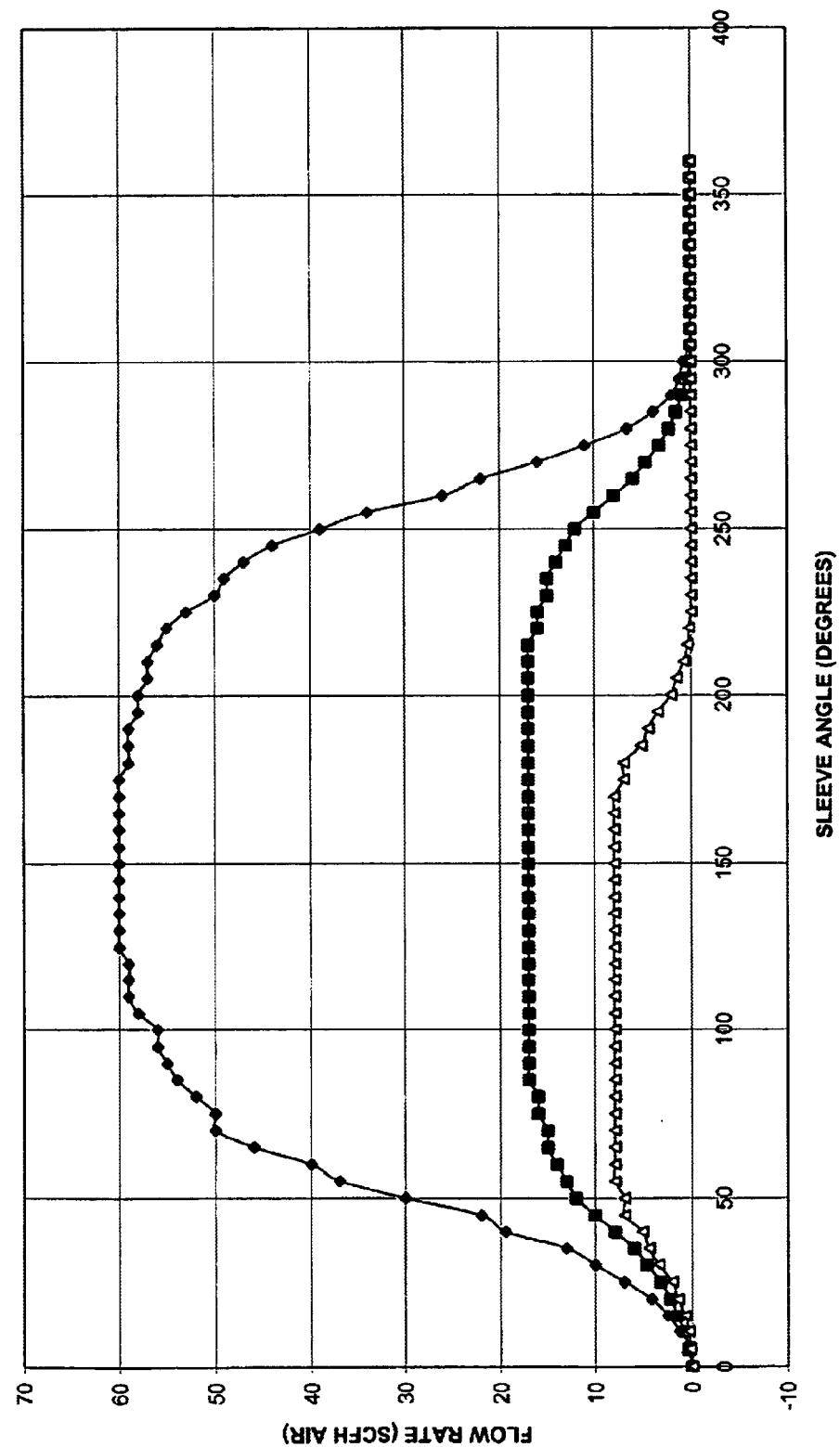
FIG. 9 is a graph of flow rates achieved when employing a sleeve valve constructed in accordance with one embodiment of the invention.

FIG. 9 illustrates the relative flow of fluid through the valve at various angular displacements of rotor 2 to spindle 8 and at various inlet aperture diameters. The aperture diameters are in thousandths of an inch, e.g., 062 in the graph key represents an aperture diameter of 62 thousandths of an inch. As can be seen in the graph results, the geometric nature of the eccentric groove and the proportions of o-ring 70 cross sections with respect to port sizes create a flow pattern that is approximately sinusoidal but approaching linear with respect to angular displacement of o-ring 70 relative to inlet aperture 14.

It has now been discovered that the sinusoidal aspects of the flow pattern can be modified almost indefinitely by machining unique perimeter patterns in eccentric bore 28 at selected points along the perimeter of the bore. One such perimeter alteration is shown in FIG. 5. A scalloped portion 72 is removed from the perimeter of eccentric bore 28 at approximately 30° from a closed position. The results of the modification are shown in FIG. 9 on the plot for the 062 test run. At the 30° point, designated A, what was previously sinusoidal closely approximates a linear flow rate or change per angle of rotation. Such a modification can be made at any point along the effective sealing area of the eccentric bore to modify the flow rate of change.

In an alternate embodiment (not shown), the metering valve may be converted to a flow control valve by making a longitudinal connection between inlet bore 10 and outlet bore 12 and adding a check valve in between the two ends of spindle 8. In a further embodiment, because of the relatively short rotational path to travel from a fully open position to a fully closed position, a return spring can be provided between rotor 2 and spindle 8 (not shown) to provide fail safe operation.

Figure 10:
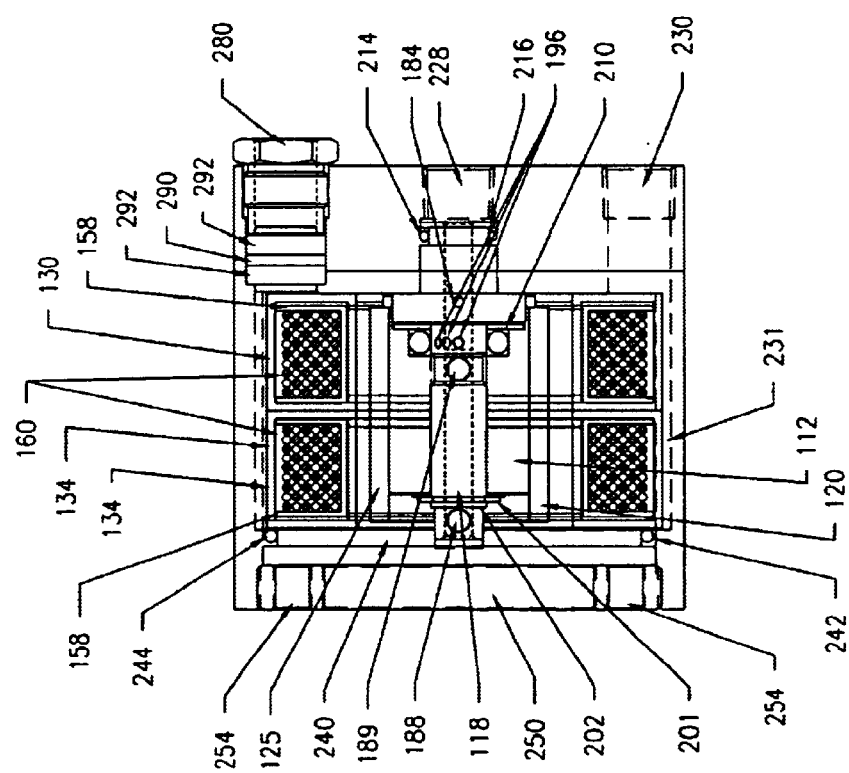
FIG. 10 is a side elevational view of a metering valve/motor assembly according to one embodiment of the invention.
Figure 11:
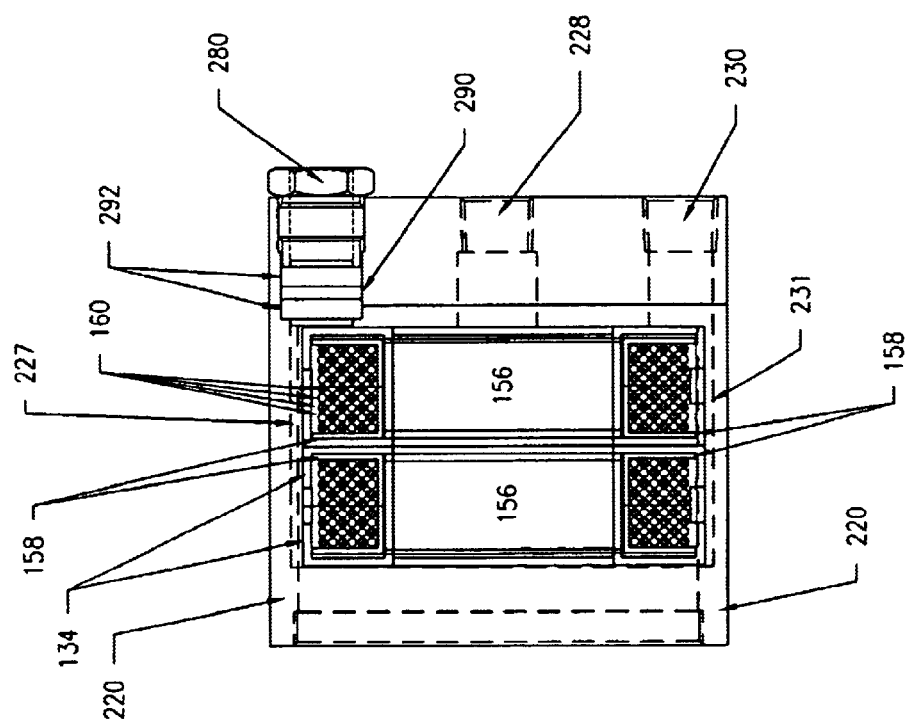
FIG. 11 is a side elevational view of a coil stator plate assembled into a housing with a wire lead pass subassembly according to one embodiment of the invention.

In a yet further embodiment, the metering valve can be incorporated into the rotor of a motor, such as for illustrative purposes, a step motor, to provide precise control over fluid flow in a compact assembly. FIG. 10 shows a metering valve/step motor assembly 100 comprising in its most general aspects, a spindle 118 concentrically arranged in a rotor 112 that is in turn concentrically arranged in a multi-pole rotor magnet 120. The combination of rotor magnet 120, rotor 112 and spindle 118 comprise a rotor assembly 125.

Rotor assembly 125 is concentrically arranged in stator assembly 130. Stator 130 comprises in one embodiment, a plurality of wire coils 132 concentrically arranged in a series of stator plates 134 that house the coils 132. Stator 130 and rotor assembly 125 are situated in a metering valve housing 135 that has a series of openings for receiving various fluid transport fittings as well as a watertight housing seal cap 136. Seal cap 136 is secured in place with a housing retaining nut 138. Each major component of the metering valve will not be described in detail with respect to particular embodiments.

The following illustrated embodiment relates to a twelve pole step motor. It is to be understood that the invention contemplates the use of motors having various pole configurations. As shown in FIGS. 11–16, stator assembly 130 comprises a series of interlocking stator plates 134 that are generally circular in shape. Stator plates 134 have a circular base 140, an axially projecting outer wall 141 formed with axially projecting stator tabs 142 and stator notches 144 that are preferably diametrically opposed in pairs and dimensioned so that the stator tabs 142 of one stator plate 134 will lock into the stator notches 144 of an adjacent stator plate 134 to form an annular cavity for housing a wire coil 132 as shown in FIG. 12B. Stator plates 134 have a central stator aperture 146 for receiving rotor assembly 125.

Extending axially from the perimeter of stator aperture 146 are a series of internal tabs 150 dimensioned and spaced apart so that the distance between adjacent internal tabs 150 is equal to the width of the individual internal tabs 150. Internal tabs are configured so that the internal tabs 150 of two stator plates 134 are capable of interlocking along with the stator tabs 142 and stator notches 144 to further form an annular cavity to receive coil 132. Preferably two wire chases or slots 152 are provided in stator base 140 and outer wall 141 to accommodate wire leads from coils 132. Slots 152 are situated on stator plates 134 so as to align with other slots 152 in adjacent stator plates 134 when interlocked and assembled. To allow for the combination of a series of interlocked stator plates 134, rivet holes 153 are formed in stator base 140. Rivets (not shown) are inserted into the rivet holes 153 of adjoining stator plate bases and secured via ball and peen hammering or other like method.

Figure 15:
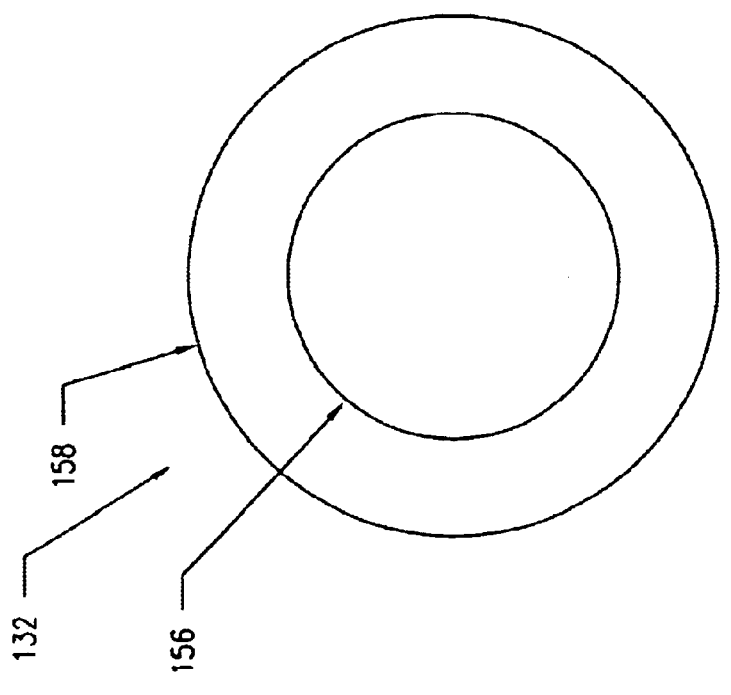
FIG. 15 is a side view of a bifilar wound, center-tapped coil according to one embodiment of the invention.
Figure 16:
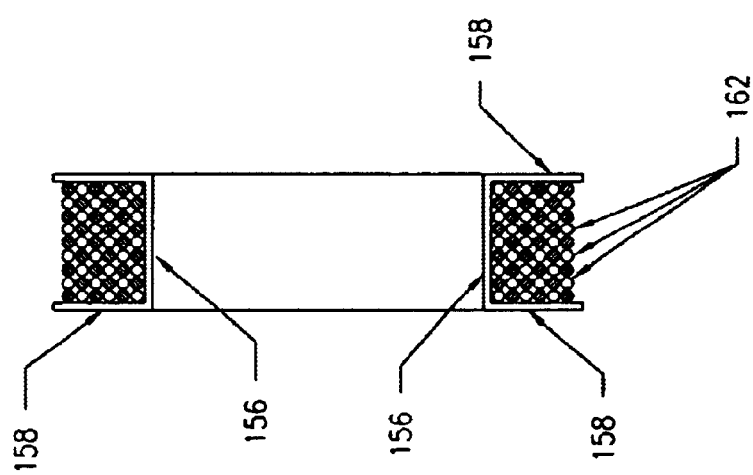
FIG. 16 is an end view of a motor coil with wire leads according to one embodiment of the invention.

Assembled within two interlocking stator plates 134 is a wire coil 132. As shown in FIGS. 15 and 16, wire coil 132 comprises a preferably hollow cylindrical spool 156 having coil walls 158 extending radially outwardly from each end of spool 156. The combination of the spool 156 and coil walls 158 form an annular channel for receiving wire windings 160 that are typically copper wire with varnish coatings or plastic covers for insulation. Extending from windings 160 are Wire leads 162 that are in electrical connection with windings 160. Positive, negative and neutral leads are preferably provided for each coil 132. Wire leads 162 provide a means to attach coil 132 to a power supply.

Positioned within, and in concentric relation with stator assembly 130 is rotor assembly 125 shown in FIGS. 17–26. Rotor 112 has a central through aperture 113 dimensioned to receive spindle 118. An eccentric bore 170 shown in FIG. 20 is formed about aperture 113 to receive an o-ring as described more fully below. A second rotor bore 172 is formed about a distal end of aperture 113 and has a diameter greater than the diameter of bore 170 and a depth less than the depth of bore 170. Second rotor bore 172 is provided to receive a radially extended base of spindle 118 as described in detail below. Extending from a distal end of rotor 112 is a spindle stop shoulder 174 that limits the range of rotation travel of spindle 118 from a fully closed position to a preferably fully open position. The length of shoulder 174 can be adjusted to accommodate a wide range of angular travel distances for spindle 118.

An outer surface of rotor 112 is fixed to an inner wall 121 of rotor magnet 120 via interference fit, mechanical fit, friction fit, adhesive or any other suitable means of securing a metallic cylindrical object to an inner wall of a ring like structure, as shown in FIG. 17. Preferably, rotor magnet 120 is preformed with alternating bands of polarity as shown in FIG. 26. The number of alternating band pairs of polarity determine the number of poles in the motor. The magnet shown in FIG. 26 has twelve poles. An outer wall 123 of magnet 120 creates an air gap with an inner wall of stator assembly 130 where magnetic flux is generated to cause rotation of rotor assembly 125.

As stated, spindle 118 is dimensioned to fit within the aperture and bores of rotor 112. FIGS. 22–24 show spindle 118 with a top cylindrical portion 180 dimensioned to fit within rotor aperture 113. Situated distal to cylindrical portion 180 is radially extending base 182 dimensioned to fit within rotor bore 172. A stop pin 184 is formed on or fixed to the perimeter of base 182 to engage shoulder 174 of rotor 113. The combination of shoulder 174 and stop pin 184 set the extreme travel positions for spindle 118 in rotor 112. A spindle inlet bore 186 is formed in cylindrical portion 180 to receive fluids or gases directed through the metering valve. Proximal and distal spindle inlet ports 188 and 189, respectively, are formed in the proximal and distal ends of cylindrical portion 180 to allow for the passage of fluid or gas entering inlet bore 186 to exit cylindrical portion 180 and travel between cylindrical portion 180 and rotor 112. An annular channel 190 is formed about the plane occupied by distal spindle inlet port 189 to enhance the amount of fluid or gas traveling to the lower portions of the rotor/spindle assembly.

A spindle outlet bore 194 is formed in a bottom portion of spindle 118. Formed at a proximal end of outlet bore 194 are preferably three metering ports 196 that are in fluid communication with outlet bore 194, and distal and proximal inlet ports 188 and 189. The use of three metering ports in this embodiment allows for higher flow rates, less fluid flow resistance and a more precise metering of fluid or gas in that the range of travel from a full shut position to a full open position can be increased to as much as 240° of angular travel as opposed to the approximately 90° of travel of the previously described embodiment.

To secure spindle 118 to rotor 112, a spindle washer and snap ring are used. Spindle 118 has a proximal annular channel 200 formed proximal to its top end to receive a snap ring 202. A washer 201 is provided about cylindrical portion 180 and between a top surface of rotor 112 and snap ring 202. The combination of snap ring 202 against rotor 112 and the nesting of spindle base 182 in rotor bore 172 secures the axial relation of spindle 118 to rotor 112.

To provide a means to control the flow of gas or fluid through metering ports 196 a metering o-ring 210 is provided about the ports to control fluid flow. Metering o-ring 210 sits in bore 170 such that the eccentric shape of bore 170 is reflected in metering o-ring 210 that conforms to the shape of bore 170. Rotation of spindle 118 within rotor 112 causes metering ports 196 to ride along the eccentric shape of metering o-ring 210 which causes the ports to be open when registered with the circular portions of bore 170 and to be closed when registered with the flattened portions of bore 170 as shown in FIG. 20. Metering o-ring 210 is preferably made from heat resistant viton, moly filled whereas other O-rings described herein can be made from buna-n rubber. To protect metering o-ring 210 from abrasion from the rotating base 182, a metering washer 212 is provided about cylindrical portion 180 and between base 182 and metering o-ring 210.

To provide a fluid tight seal between the spindle and the metering valve housing described below, a spindle o-ring 214 is provided about a distal end of spindle 118. A distal spindle channel 216 is formed in the distal end of spindle 118 to receive spindle o-ring 214.

A metering valve housing 220 is provided to house the combined stator assembly 130 and rotor assembly 125 as shown in FIGS. 34–44. Housing 220 comprises a generally cylindrical body 221 having a central bore 222 dimensioned to receive stator assembly 130. Extending axially from a distal end of housing 220 is a ridge 224. A preferably threaded wire aperture 226 is formed in ridge 224 to provide an exit for wire leads 162. An outlet port 228 is formed substantially in a central portion of ridge 224 so as to be in fluid communication with central bore 222. An inlet port 230 is formed in ridge 224 on a lateral end of ridge 224 opposite the lateral end at which wire aperture 226 is formed. Inlet port 230 is in fluid communication with central bore 222. Wire aperture 226, outlet port 228 and inlet port 230 are preferably threaded about inner walls to accommodate fittings for pipe or other connections. Preferably, the outer radial sections 227 and 231, respectively, of the bores for wire aperture 226 and inlet port 230 extend partially down into central bore 222 and extend radially outwardly into the walls defining central bore 222 so that wire and fluid inlet passages are formed when stator assembly 130 is placed in central bore 222.

Figures 38, 39:
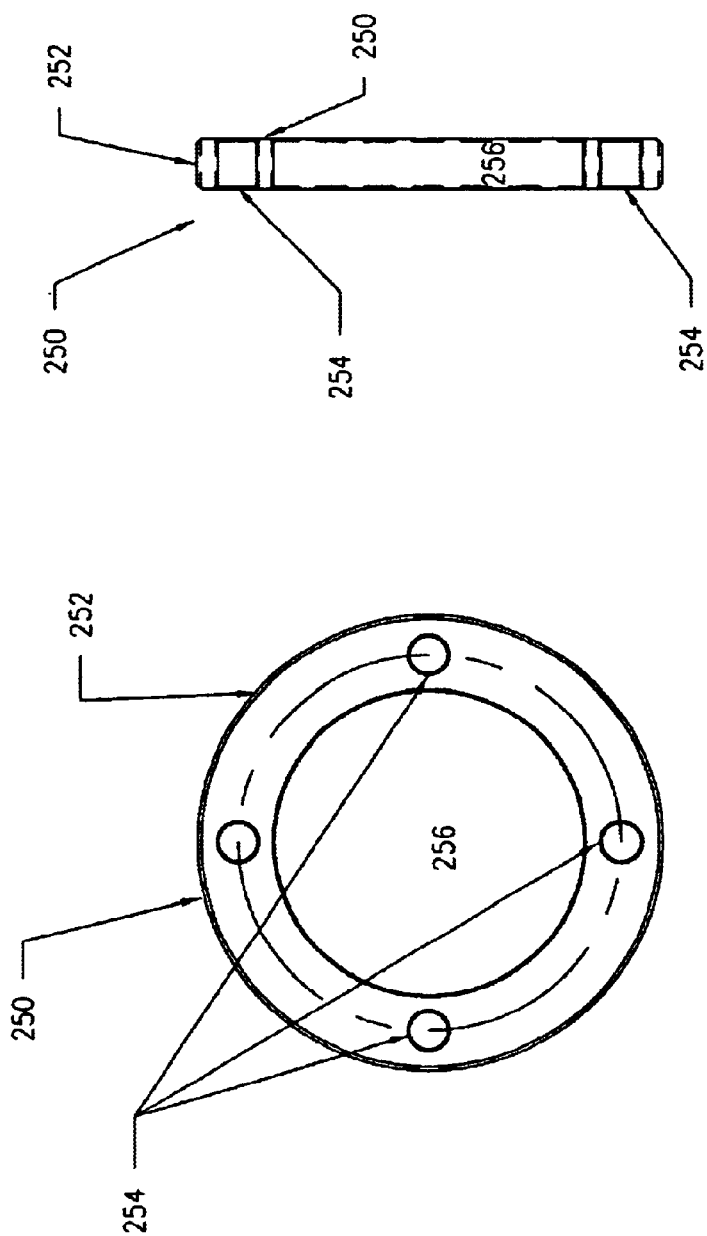
FIG. 38 is a retaining nut according to one embodiment of the invention.
FIG. 39 is a side view of a retaining nut according to one embodiment of the invention.
Figures 43, 44:
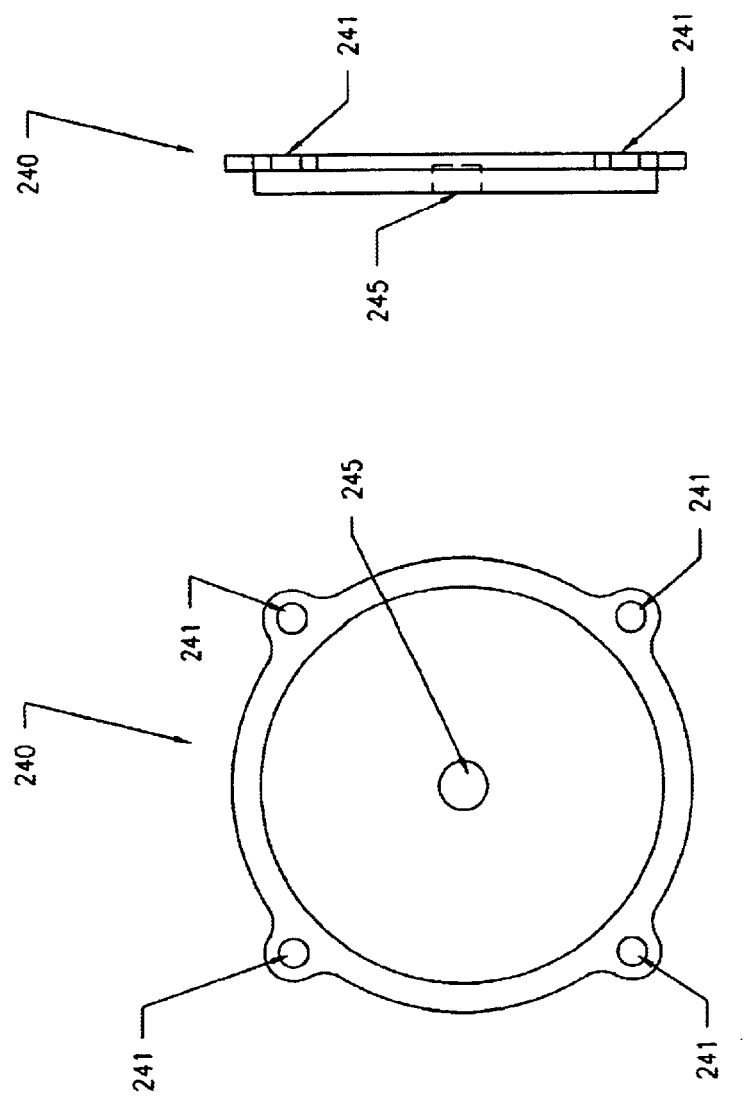
FIG. 43 is a top view of a die-cast metering valve cap according to one embodiment of the invention.
FIG. 44 is a side view of a die-cast metering valve cap according to one embodiment of the invention.

A top end of housing 220 preferably has threading formed about an inner wall to receive a retaining nut 250 shown in FIGS. 38 and 39. A cylindrical seal cap 240 is provided to seal the top end of housing 220 after the stator/rotor assembly is mounted in the housing. Seal cap 240 has an annular cap channel 242 formed about an outer circumferential edge of the cap to receive a housing o-ring 244 shown in FIG. 10. A central spindle receiving bore 245 is provided to stabilize the axial alignment of spindle 218, if necessary. Following the positioning of seal cap 240 in housing 220, a cylindrical retaining nut 250 is torqued into the top end of housing 220 by mating external threads 252 formed on the outer perimeter of retaining nut 250. Retaining nut 250 is preferably formed with bores or apertures 254 to receive torquing tools such as a spanner wrench as is well known in the art to torque retaining nut 250 into housing 220. Retaining nut 250 can be formed with a central aperture 256 or can be a solid cylindrical plate.

In an alternative embodiment, housing 220 can be die-cast as shown in FIGS. 41–44. Components of the die-cast version that correspond to the components of the machined version described above are designated with prime numbers that correspond to the numbers designating the components of the machined version. The primary difference between the versions is that the die-case version is amenable to having mechanical fastener bores formed in appendages 270 of housing 220' to receive mechanical fasteners (not shown) used to secure cap 240' to housing 220' via mechanical fastener bores 241 formed about the circumference of cap 240'.

Figure 27:
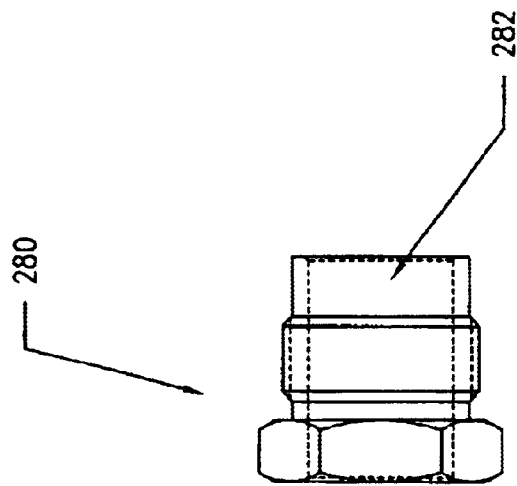
FIG. 27 is a side view of a gland nut according to one embodiment of the invention.
Figure 28:
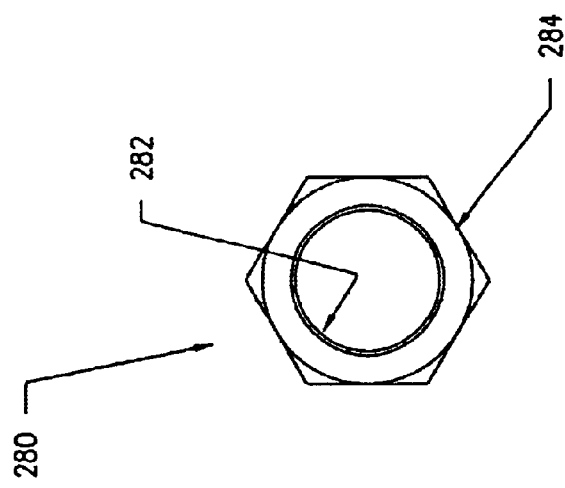
FIG. 28 is a top view of a gland nut according to one embodiment of the invention.

To provide a smooth exit channel for lead wires 162 that exit housing 220, a gland nut 280 is provided with external threading that engages the internal threading of wire aperture 226 as shown in FIGS. 10, 27 and 28. Gland nut 280 has a central aperture 282 for receiving wire leads 162. A hex shaped flange 284 is provided to facilitate torquing of gland nut 280 into wire aperture 226. To provide a watertight seal to the wire exit port 226, a combination of a wire pass through seal 290 is sandwiched between a pair of seal support plates 292. Both the support plates and seal are formed with a plurality of apertures for passage of lead wires 162 through the components. To effectuate the seal, one support plate 292 is placed into the bottom of wire aperture 226 followed by seal 290 and the second support plate 292. By torquing gland nut onto the second support plate 292 causes seal 290 to compress against the wall of wire aperture 226. Seal 290 is preferably made from buna-n rubber and the support plates are preferably made from glass-reinforced nylon.

To operate the metering valve, fluid or gas is allowed to flow into inlet port 230. The fluid or gas proceeds down into the annular space between stator 130 and housing 220. The gas travels to and enters the inlet bore 186 of spindle 188 and travels out of the bores 188 and 189 into the annular gap between rotor 112 and spindle 118. Depending on the orientation of rotor 112 to spindle 118, the metering ports 196, if open, will allow the entry of the gas or fluid which travels up the exit port 194 of spindle 118 and out the exit port 228 of housing 220.

Having described the invention it should be understood that the foregoing description of the invention is intended- .merely to be illustrative thereof and that other modifications, embodiments and equivalents may be apparent to those who are skilled in the art without departing from its spirit. Having thus described the invention what we claim as new and desire to secure by U.S. Letters Patent is:

What is claimed is:

1. A valve comprising:

a spindle having an inlet bore extending longitudinally from a top end of the rotor with a radial inlet aperture and an outlet bore extending longitudinally from a bottom end of the rotor with a radial outlet aperture;

a rotor having a first bore dimensioned to receive the spindle and a second bore in eccentric orientation to the first bore;

an o-ring dimensioned to fit within the second bore of the rotor;

a rotor cap having a cap bore dimensioned to receive a top end of the rotor;

a mounting plate having a top surface to which the rotor gear is affixed;

a drive gear in synchronous orientation with the rotor gear;

a motor attached to a bottom surface of the mounting plate and having a shaft to which the drive gear is attached.

2. The valve of claim 1 further comprising a second o-ring situated between the rotor and the spindle.

3. The valve of claim 2 further comprising a rotor fluid bore formed in the rotor.

4. The valve of claim 3 further comprising a spindle bore formed in the spindle in fluid communication with the rotor fluid bore.

5. The valve of claim 1 wherein the rotor cap has a substantially cylindrical cap body and a cap spindle bore dimensioned to fit against the outer wall of the spindle.

* * * * *